United States Patent [19]

Ninomiya et al.

[11] Patent Number: 4,566,419

[45] Date of Patent: Jan. 28, 1986

[54] APPARATUS AND METHOD FOR CONTROLLING AIR-TO-FUEL RATIO FOR AN INTERNAL COMBUSTION ENGINE

[75] Inventors: Masakazu Ninomiya; Hideya Fujisawa; Norio Omori, all of Kariya; Atsushi Suzuki, Oobu, all of Japan

[73] Assignee: Nippondenso Co., Ltd., Kariya, Japan

[21] Appl. No.: 640,987

[22] Filed: Aug. 15, 1984

[30] Foreign Application Priority Data

Aug. 20, 1983 [JP] Japan ............................... 58-152064
Aug. 20, 1983 [JP] Japan ............................... 58-152063

[51] Int. Cl.[4] ......................... F02B 3/00; G01N 27/58

[52] U.S. Cl. .................................... 123/489; 123/440; 204/1 T; 204/424

[58] Field of Search ............................... 123/489, 440; 204/195 S, 1 T; 364/497

[56] References Cited

U.S. PATENT DOCUMENTS

| | | | |
|---|---|---|---|
| 4,156,404 | 5/1979 | Anzas | 123/440 |
| 4,170,965 | 10/1979 | Aono | 123/440 |
| 4,208,993 | 6/1980 | Peter | 123/440 |
| 4,214,563 | 7/1980 | Hosaka | 123/440 |
| 4,226,221 | 10/1980 | Asano | 123/440 |
| 4,237,829 | 12/1980 | Asano et al. | 123/440 |
| 4,332,225 | 6/1982 | Cox et al. | 123/440 |
| 4,344,317 | 8/1982 | Hattori et al. | 123/440 |
| 4,354,468 | 10/1982 | Sone et al. | 123/440 |
| 4,355,618 | 10/1982 | Muller et al. | 123/440 |
| 4,356,065 | 10/1982 | Dietz | 123/489 |
| 4,359,030 | 11/1982 | Sone et al. | 123/440 |
| 4,430,976 | 2/1984 | Kondo et al. | 123/440 |

*Primary Examiner*—Raymond A. Nelli
*Attorney, Agent, or Firm*—Cushman, Darby & Cushman

[57] ABSTRACT

A gas sensor of constant-current type is used to detect a gas component in exhaust gases from an internal combustion engine so as to perform feedback control of air/fuel ratio of an air-fuel mixture supplied to the engine. In order to detect an air/fuel ratio which is richer than a stoichiometric value, a voltage applied to the gas sensor is set to a high value so that the gas sensor does not exhibit a constant-current characteristic. In the case it is desired to detect an air/fuel ratio which is either richer or leaner than the stoichiometric value, the voltage may be changed between the high value and a lower value at which the gas sensor exhibits a constant-current characteristic. Engine parameters are detected to determine whether the engine requires a rich mixture or a lean mixture, and the voltage may be changed as the result of such determination. An output current of the gas sensor is detected to ascertain air/fuel ratio so that air/fuel ratio is controlled to a desired value suitable for engine operating condition.

6 Claims, 7 Drawing Figures

APPARATUS AND METHOD FOR CONTROLLING AIR-TO-FUEL RATIO FOR AN INTERNAL COMBUSTION ENGINE

BACKGROUND OF THE INVENTION

This application is related to a co-pending application Ser. No. 585,861, filed on Mar. 2, 1984.

This invention relates generally to air/fuel ratio control for an internal combustion engine, and more particularly to a feedback control of the same.

It is generally known that noxious components within exhaust gases of an internal combustion engine can be reduced when the air/fuel ratio of an air-fuel mixture supplied to the engine is set to a stoichiometric value and a three-way catalytic converter is used. Therefore, if an engine is operated in various modes at such a stoichiometric air/fuel ratio using a three-way catalytic converter, then exhaust gases include less noxious components to an ideal extent. However, when an engine is operated at such a stoichiomentric air/fuel ratio throughout all operating modes thereof, increase in fuel comsumption results, and therefore such a simple approach is not advantagous in view of fuel cost. In actual practice, internal combustion engines of automobiles are operated with a rich mixture, such as A:F nearly equals 13, in accelerating mode (high load operating mode), and with a lean mixture in cruising mode (partial or mediam load operating mode).

In the case of an engine with a supercharger, a rich mixture is sometimes fed to the engine for cooling the same for preventing possible temperature raise. In such a case, it is necessary to control the A/F ratio with high accuracy so as to prevent misfiring which is caused from exececessively rich mixture.

SUMMARY OF THE INVENTION

The present invention has been developed in order to remove the above-described drawbacks inherent to the conventional air/fuel control apparatus and method for an internal combustion engine.

It is, therefore, an object of the present invention to provide a new and useful apparatus and method for controlling air-to-fuel ratio of a mixture supplied to an internal combustion engine so that air/fuel ratio can be accurately controlled in both rich and lean ranges where the air/fuel ratio is either richer or leaner than a stoichiometric value.

According to a feature of the present invention a gas sensor of constant-current type is used to detect a gas component in exhaust gases from an internal combustion engine so as to perform feedback control of air/fuel ratio of an air-fuel mixture supplied to the engine. In order to detect an air/fuel ratio which is richer than a stoichiometric value, a voltage applied to the gas sensor is set to a high value so that the gas sensor does not exhibit a constant-current characteristic. In the case it is desired to detect an air/fuel ratio which is either richer or leaner than the stoichiometric value, the voltage may be changed between the high value and a lower value at which the gas sensor exhibits a constant-current characteristic. Engine parameters are detected to determine whether the engine requires a rich mixture or a lean mixture, and the voltage may be changed as the result of such determination. An output current of the gas sensor is detected to ascertain air/fuel ratio so that air/fuel ratio is controlled to a desired value suitable for engine operating condition.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

In the apparatus for controlling air/fuel ratio according to the present invention, a gas sensor of limit current detection type is used as an air/fuel ratio sensor. Such a gas sensor of limit current detection type is known through a Japanese Patent Provisional Publication No. 57-48648, and will be described with reference to FIGS. 1 and 2 for a better understanding of the present invention.

Figure 1:
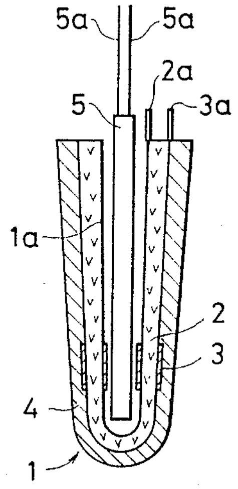
FIG. 1 is a schemmatic cross-sectional view of a gas sensor of constant-current type used in the apparatus according to the present invention.

FIG. 1 shows a schematic cross-sectional view of a gas sensor 1 of constant or limited current type. The reference numeral 1a indicates a solid-state electrolyte element having an open end and a closed end so as to form a cup-like shape. This element 1a has a structure such that an inner surface thereof is exposed via an internal electrode 2 to reference oxygen such as atmosphere, and an outer surface is exposed via an outer electrode 3 and a diffusion resistor layer 4 to a detecting gas.

In the case of detecting air/fuel ratio by producing a constant or limited current in accordance with the density of oxygen in a range leaner than the stoichiometric value, the electrode 3 at the side of a detecting gas has an area ranging from 10 to 100 $mm^2$ and a thickness ranging from 0.5 to 2.0 micrometers, while the other electrode 2 at the side of atmosphere has an area equal to or greater than 10 $mm^2$ and a thickness ranging from 0.5 to 2.0 micrometers. Each of the electrodes 2 and 3 is formed to be sufficiently porous by effecting chemical plating, sputtering or paste screen process printing on a precious metal having high catalytic activity, such as platinum. The diffusion resistor layer 4 is formed by way of plasma spray coating of a substance, such as $Al_2O_3$, $Al_2O_3$. MgO, or $ZrO_2$, so that the thickness is 100 to 700 micrometers, the porosity is 7 to 15 %, and an average pore size is 600 to 1200 Å. Since the value of the constant current in correspondence with the density of oxygen is determined by the area of the electrode 3, the thickness, porosity, and average pore size of the diffusion resistor layer 4, these values should be accurately controlled. The reference 5 is a heater, and the references 2*a*, 3*a* and 5*a* are lead wires.

The gas sensor shown in FIG. 1 operates as follows. The gas sensor 1 is fixed within an exhaust pipe of an internal combustion engine. The exhaust gases emitted from an internal combustion engine include various gas components, such as $O_2$, CO, HC, etc. As is well known, the density of these gas components vary in accordance with the air/fuel ratio of the mixture combusted within the cylinders of the engine. A voltage is applied across the porous electrodes 2 and 3 provided to both sides of the element 1*a* so that oxygen ions are diffused from one electrode toward the other electrode. It is known that a current flowing between the electrodes 2 and 3 does not change even if the applied voltage is changed within a given range when the density of oxygen is constant. In other words, a constant current characteristic is exhibited.

Figure 2:
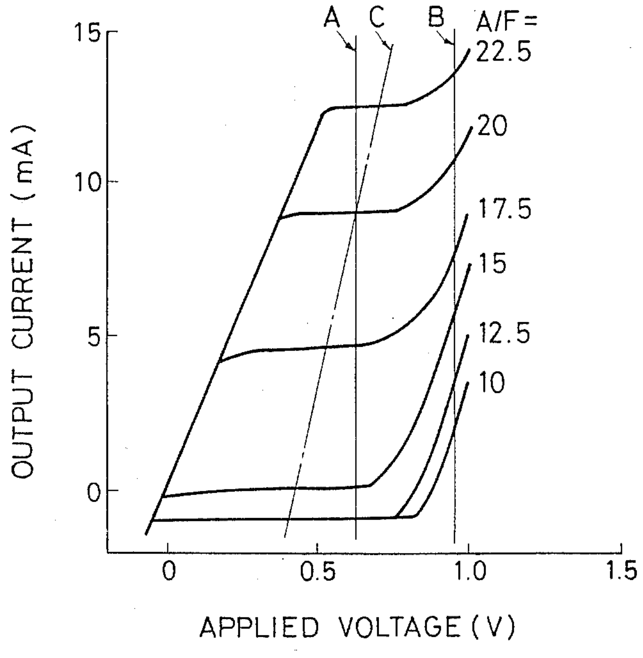
FIG. 2 is an explanatory graph showing the characteristic of the gas sensor shown in FIG. 1 and the way of using the gas sensor according to the present invention.

FIG. 2 shows the relationship between an applied voltage and an output current of the gas sensor 1 of constant current type. When a predetermined voltage, such as 0.6 V, is applied to the sensor 1 (see a line A), the density of oxygen within the exhaust pipe can be detected by detecting the output current. This state may be more easily understood from a curve D of FIG. 3. However, since the value of the output current changes sharply only when the air/fuel ratio is above 15, the air/fuel ratio control can be performed using the output current from the gas sensor 1 only within a range leaner than the stoichiometric value. In the graph of FIG. 2, if the applied voltage has a slope with respect to the output current as shown by a dot-dash line C, the measurement of air/fuel ratio throughout a wide range is possible even if a constant-current range becomes narrower due to secular change, deterioration and temperature characteristic of the gas sensor 1.

The above-described operation of the gas sensor 1 is limited to the measurement of air/fuel ratio which is within a lean range. In the case that the air/fuel ratio is richer than the stoichiometric value, since the density of oxygen within the exhaust gases is low, the number of oxygen ions passing through the diffusion resistor layer 4 to reach the electrode 3 is small. Namely, the richer the mixture, the smaller the number of such oxygen ions. As a result, in a lean range a partial pressure of oxygen approaches zero, and therefore the value of the constant current approaches zero as air/fuel ratio becomes leaner and leaner.

According to experiments by the inventors of the present invention, when the voltage applied to the gas sensor 1 is fixed to a voltage, such as 0.95 V, which is higher than a maximum voltage which cause the occurrence of a constant current, the output current varies as a function of the applied voltage as seen at a line B in FIG. 2. More specifically, air/fuel ratio can be detected even in a range richer than the stoichiometric value. The reason that such detection is possible is considered because of the contribution of oxygen, of gases other than oxygen, such as CO and NOx, and generation of oxygen gas due to deoxidation.

Figure 3:
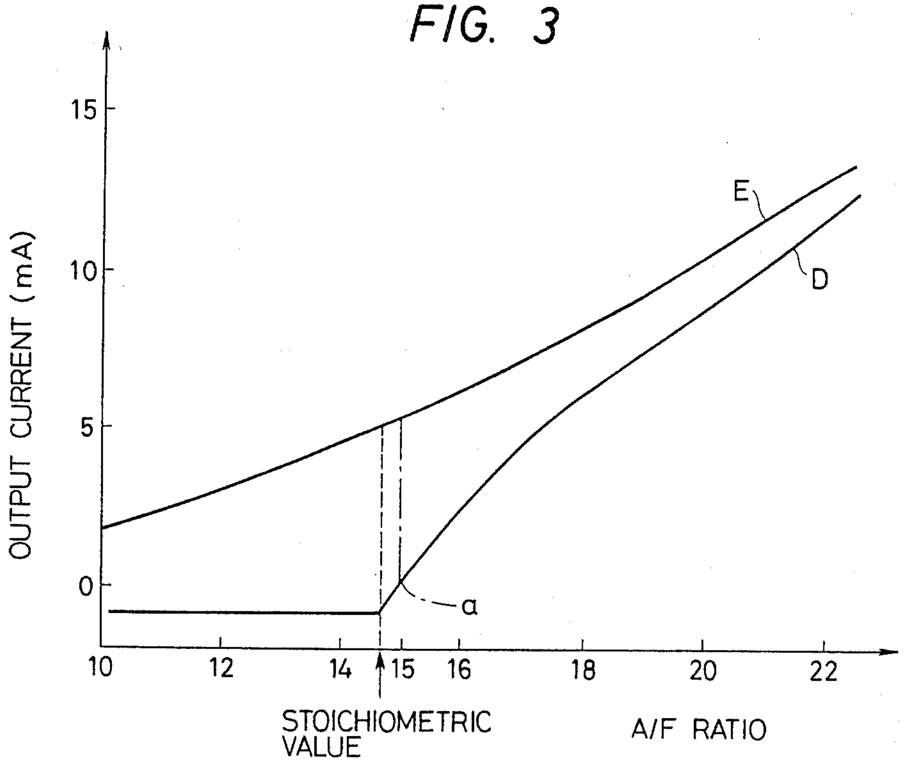
FIG. 3 is a graph showing the relationship between air/fuel ratio and an output current from the gas sensor of FIG. 1.

A curve E in FIG. 3 shows the relationship between air/fuel ratio values and output currents from the gas sensor 1 when the voltage applied thereto is fixed to 0.95 V. As will be understood from the curve E, it is possible to detect air/fuel ratio even in a range richer than the stoichiometric value, i.e. approximately 15. In addition, if the curve E is used, air/fuel ratio is detectable continuously from a rich range to a lean range.

Comparing the curves D and E, it will be understood that the curve D shows a larger change in the output current with respect to a given change in air/fuel ratio than the other curve E. In other words, the curve D is more sensitive than the curve E. Furthermore, the output current value according to the curve E is larger than that according to the curve D. Generally speaking, it is known that a larger current flowing through a gas sensor is apt to be a cause for the deterioration of the element 1*a*, and such a problem of deterioration is significant when a large current is continuously applied to the gas sensor 1 all the time. In order to solve this problem therefore, when air/fuel ratio is within a lean range, i.e. the righthand region from the stoichiometric value or a value "a" higher than and close to the stoichiometric value, the curve D may be used, and on the other hand when air/fuel ratio is within a rich range, i.e. the lefthand region from the stoichiometric value or the value "a", the other curve E may be used. With this arrangement it is possible to obtain a high sensitivity within a lean range and to prevent the gas sensor from deteriorating due to the application of a large current all the time while it is also possible to detect air/fuel ratio throughout all the range thereof. In the case that the curves D and E are selectively used, it is preferable to give a hysteresis characteristic so that switching between these two curves may be smoothly performed without suffering from hunting.

Figure 4:
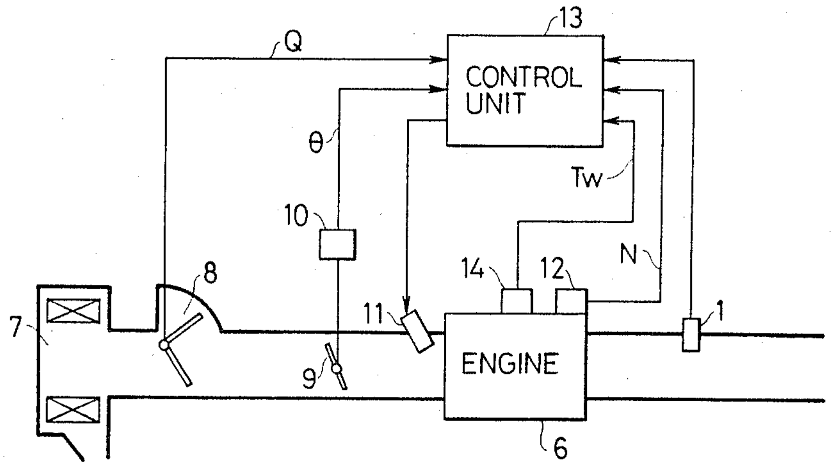
FIG. 4 is a schematic block diagram of the apparatus according to the present invention.

FIG. 4 shows a schematic block diagram of the air/fuel ratio control apparatus according to the present invention, where the apparatus employs the above-described gas sensor of constant current type. The reference 7 is an air cleaner through which air is introduced into an intake manifold of an internal combustion engine 6. Within the intake manifold is provided an airflow meter 8 and a throttle valve 9. A throttle valve opening degree sensor 9 is associated with the throttle valve 9 for detecting the opening degree of the same. The reference 11 is a fuel injection valve through which fuel is injected into the engine 1. While only one injection valve 11 is shown for simplicity. The number of injection valves is actually a plural which is equal to the number of cylinders of the engine 6. An engine speed sensor 12 is provided to detect the rotational speed of the engine crankshaft, while a coolant temperature sensor 14 is also provided to detect engine coolant temperature. The above-described gas sensor 1 of FIG. 1 is provided to an exhaust pipe. The reference 13 is a control unit which controls the opening timing and opening duration of the injection valve 11 using various signals from the airflow meter 8, the throttle valve opening degree sensor 9, the engine speed sensor 12 and the gas sensor 1. In addition intake air temperature and intake vacuum pressure may be detected by way of known sensors to supply the control unit 13 with further information as is well known in the art.

Figure 5:
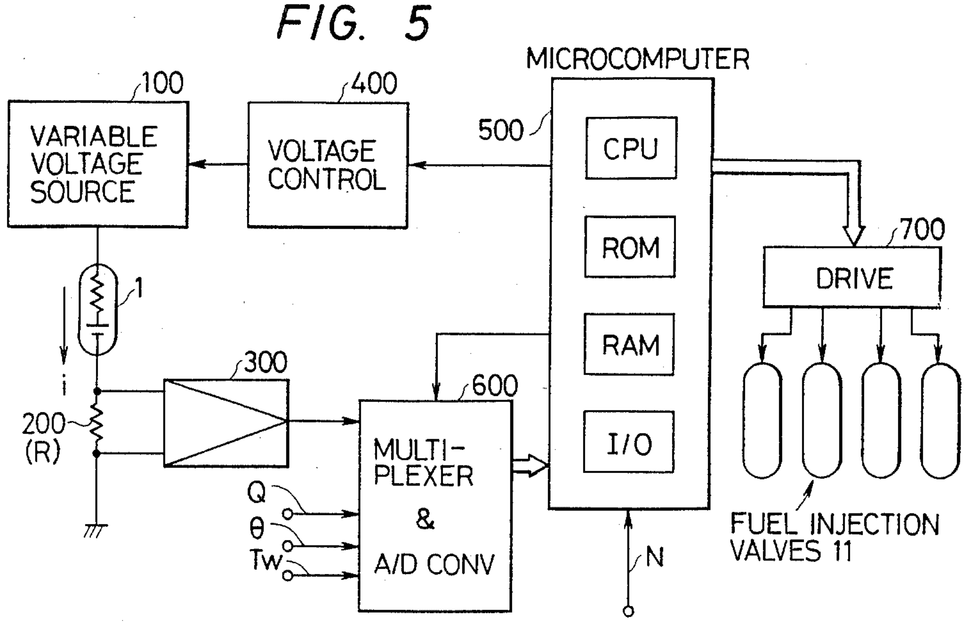
FIG. 5 is a schematic block diagram showing an important part in the apparatus of FIG. 4.

FIG. 5 shows a detailed block diagram of the air/fuel ratio control apparatus according to the present invention. The control unit 13 of FIG. 1 comprises a microcomputer 500, a variable voltage source 100, a voltage control circuit 400, an input processor 300 having an amplifier, an analog processing circuit 600 and a drive stage 700. Various analog signals from the above-mentioned airflow meter 8, the throttle valve opening degree sensor 10 and the engine coolant sensor 14 are fed to the analog processing circuit 600 having an analog multiplexer and an analog-to-digital (A/D) converter so that information relating to intake air quantity Q, throttle valve opening angle $\theta$, and the coolant temperature Tw is fed to the microcomputer 500. An output signal from the engine speed sensor 12 is fed to the microcomputer 500 to supply the same with detected engine speed N. The drive 700 stage is responsive to output data from the microcomputer 500 for controlling the opening timing and opening duration of respective fuel injectors 11 so as to control the air/fuel ratio of the mixture. The voltage control ciruit 400 is responsive to an output signal from the microcomputer 500 for controlling the variable voltage source 100 having a voltage divider for producing two or more different voltages so that a voltage applied to the gas sensor 1 is switched between a first voltage Va, such as 0.4 to 0.7 V, and a second voltage Vb, such as 0.8 to 1.1 V, which is higher than the first voltage Va. This second voltage Vb should be set to a value so that the gas sensor 1 does not exhibit a constant-current characteristic. Furthermore, the voltage control circuit 400 controls the variable voltage source 100 so as to cut the application of a voltage to the gas sensor 1 or to reduce the voltage to a value lower than the first voltage Va in the case feedback control is not desired.

The gas sensor 1 is shown by way of a series circuit of a resistor and a voltage source, and is connected in series with a resistor 200 having a small resistance. As either of the first and second voltages Va and Vb is applied from the variable voltage source 100 to the series circuit of the gas sensor 1 and the resistor 200, a current "i" substantially proportional to the air/fuel ratio of the mixture flows through the series circuit. A voltage drop caused from the current "i" flowing therethrough is detected by the input processing circuit 300 such that the voltage drop is amplified to a necessary amplitude.

The microcomputer 500 basically determines the amount of fuel to be supplied to the engine cylinders through the fuel injection valves 11 using the intake air Q and the engine speed N by controlling opening duration of the fuel injection valves 11. When feedback control is effected, an air/fuel ratio value represented by the output current from the gas sensor 1 is detected so as to find the deviation of the detected air/fuel ratio from a desired air/fuel ratio suitable for detected engine operating condition. This deviation or difference is used to control the amount of fuel to be injected so that a detected air/fuel ratio equals the desired air/fuel ratio. Various values of desired air/fuel ratio suitable for various engine operating conditions defined by the values of Q and N are prestored in the form of a map in a read-only memory (ROM) of the microcomputer 500. Such a feedback control is preferably performed when the gas sensor 1 is in active state where the temperature of the gas sensor 1 is over 650 degrees centigrade, and when the engine is in a warmed up state where the coolant temperature is above 70 degrees centigrade. However, it is unnecessary that all of these conditions are completely satisfied for effecting feedback control.

Figure 6:
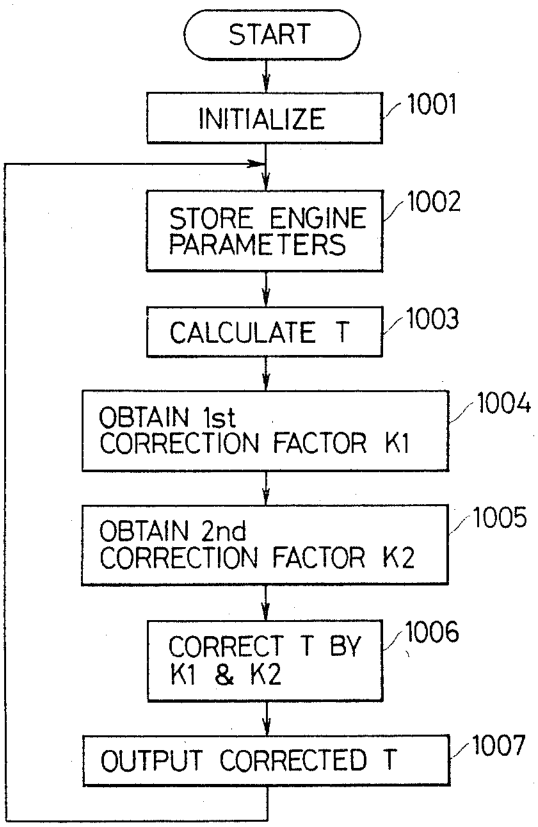
FIGS. 6 and 7 are flowcharts showing the operation of a computer used in the apparatus according to the present invention.

The operation of the microcomputer 500 will be described with reference to flowcharts shown in FIGS. 6 and 7. FIG. 6 shows a basic routine for determining the amount of fuel to be injected through the injection valves 11 where the routine is arranged to be started when a key switch (not shown) is turned on to start the engine 6. When the routine of FIG. 6 is started, initialization is effected in a step 1001 for initializing various variables. In a subsequent step 1002, various parameters or data, such as the intake air quantity Q, engine speed N, throttle valve opening degree $\theta$, engine coolant temperature Tw, are read and stored into a random-access memory (RAM). In addition, the voltage across the resistor 200 is read to obtain the current "i". The actual current data "i" is also stored in the RAM. In a step 1003, a fundamental fuel amount is determined by reading out a datum from a fundamental fuel amount map in the ROM using intake airflow Q and engine speed N. The fundamental fuel amount is represented by a fundamental valve opening duration T. In a following step 1004, a first correction factor K1 for correcting the fundamental fuel amount determined in the step 1003 is calculated using coolant temperature Tw and other information such as from a starter switch (not shown), an intake air temperature sensor (not shown), and so on. A value of the first correction factor K1 determined in this way is then stored in the RAM of the microcomputer 500. When determining the first correction factor K1, other information inherent to the engine 6, such as a factor for fuel increase for acceleration may be used if desired.

In a following step 1005, a second correction factor K2 is calculated using the detected current value "i". More specifically, actual air/fuel ratio is detected on the basis of the detected current "i" first, and then a disired air/fuel ratio for the engine operating condition at the present time is read out from the ROM so that the difference between the actual air/fuel ratio and the desired air/fuel ratio is obtained. When the value of the second correction factor K2 is calculated so that the difference becomes zero. The second correction factor K2 is stored in the RAM to be used in the following step 1006 where the fundamental fuel amount as well as the first and second correction factors K1 and K2 are read out from the RAM to correct the fundamental fuel amount by the first and second correction factors K1 and K2. When a most suitable amount of fuel to be injected by way of the fuel injection valves 11 is determined, this data is set in an output portion and then output signals are fed to the drive stage 700 at a given crankangle of the engine. The above-described general operation for air/fuel ratio control is well known in the art except for the use of a gas sensor of constant current type. For instance, air/fuel ratio control disclosed in U.S. Pat. No. 4,430,976 may be used.

The present invention has a novel feature in the step 1005 in which the second correction factor K2 is determined. This step 1005 for determining the second correction factor K2 using the value of a detected current "i" flowing through the gas sensor 1 will be described in detail with reference to another flowchart of FIG. 7.

Figure 7:
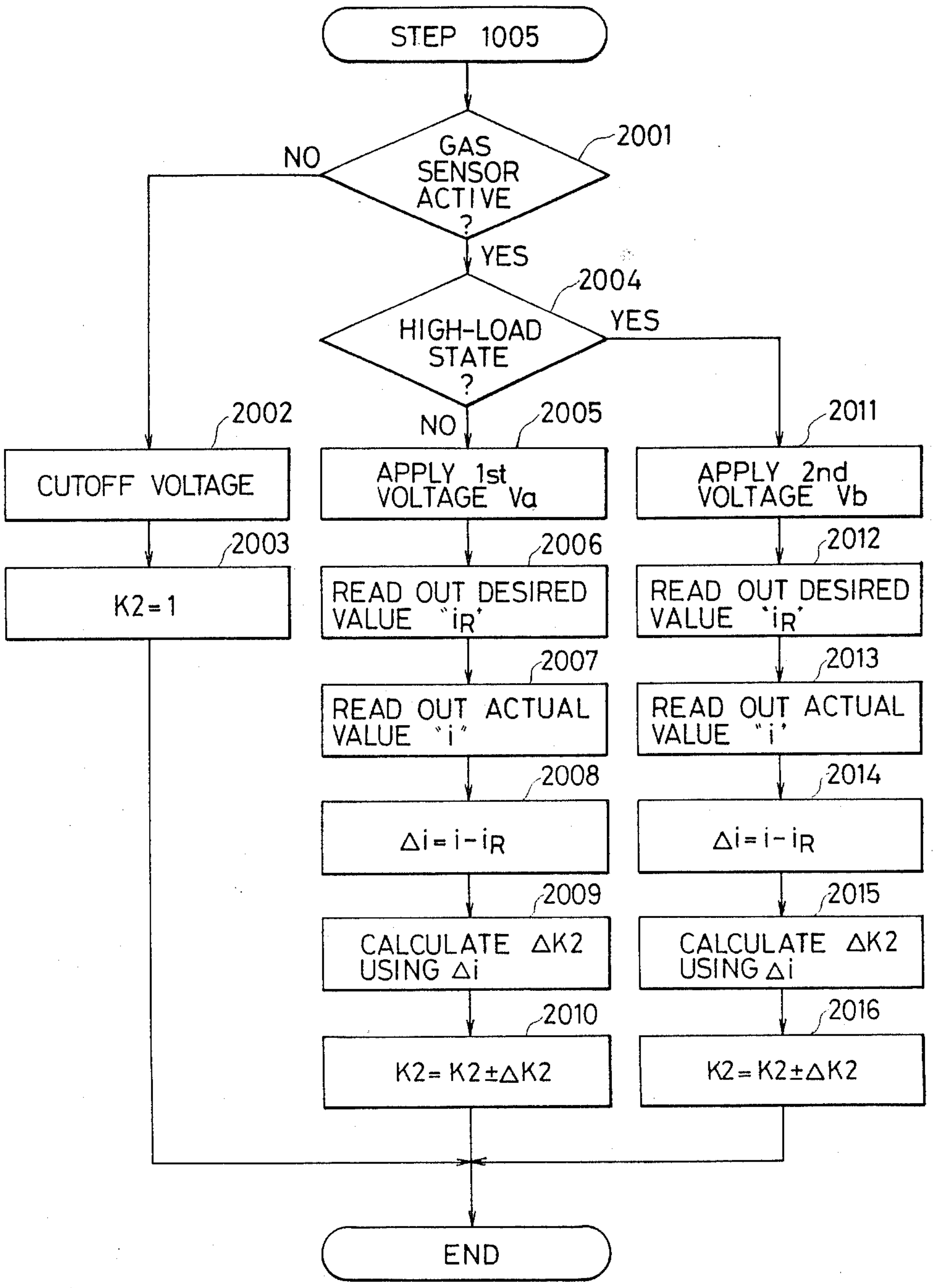

In a first step 2001 of the routine of FIG. 7, it is determined whether the gas sensor 1 is either in active state or not to determine whether it is possible to perform feedback control or not. More specifically, the temperature of the gas sensor 1 per se may be detected or the value of an internal resistance of the gas sensor 1 per se may be detected with a given bias being fed to the gas sensor 1. Furthermore, an active state of the gas sensor 1 may be assumed indirectly by watching the coolant temperature Tw or the lapse of time or an accumulated number of times of combustions from the instant of engine start.

If the gas sensor 1 is in inactive state, a step 2002 is executed to cutoff the voltage to the gas sensor 1, and subsequently in a step 2003, the second correction factor K2 is set to 1 thereby preventing integration processing which will be described hereinlater.

On the other hand, if the gas sensor 1 is in an active state so that feedback control is available, a step 2004 is executed to determine whether the engine 6 is in high-load state or not. Such a high-load state of the engine 6 may be detected using one or more engine parameters as follows. For instance, a sudden accelerating mode is one of typical states of a high-load state, and the opening degree $\theta$ of the throttle valve 8 as well as its varying speed $\Delta\theta$, intake air quantity Q as well as its increasing speed $\Delta Q$, intake manifold pressure P as well as its varying speed $\Delta P$ and/or fuel injection pulse width T may be used to determine whether the engine 6 is in sudden accelerating state or not. High-load state of the engine 6 other than such a sudden accelerating condition includes ascent driving mode, high-speed driving mode, over-loaded driving and so on. Such high-load state may be detected from a combination of the engine speed N and one of the above-mentioned engine parameters.

Assuming that the engine is not in high-load state, namely engine is being operated in a normal mode, then steps 2005 and 2010 are executed so that the mixture fed to the engine 6 shows an air/fuel ratio leaner than the stoichiometric value. In the step 2005, the first voltage Va (see line A in FIG. 2) is applied to the gas sensor 1. Then in a following step 2006, a value of the output current "$i_R$" of the gas sensor 1 which represents a most suitable air/fuel ratio to the engine operating conditions at this time is read out from the map within the ROM using engine speed N and intake air quantity Q. In the subsequent step 2007, an actual value of the output current "i" of the gas sensor 1 prestored in the RAM is read out, and the difference $\Delta i$ between "i" and "$i_R$" is calculated in the step 2008. This difference $\Delta i$ is used in the step 2009 to calculate an accumulative amount $\Delta K2$ used in subsequent integration processing. The value of $\Delta K2$ may be either changed in accordance with the magnitude of the difference $\Delta i$ or may be held constant all the time where such selection may be determined in view of a desired response in the feedback control, a desired control accuracy, a desired matching to the engine or the like. The accumulative amount $\Delta K2$ is then used in the step 2010 in which integration processing is executed to determine the value of the second correction factor K2. The greater the difference $\Delta i$, and the greater the accumulative amount $\Delta K2$, the second correction factor K2 determined by integration processing $K2 = K2 \pm \Delta K2$ varies greately, and therefore the amount of fuel to be supplied to the engine 6 can be optimally controlled thereby obtaining quick response.

Turning back to the step 2004, if it is determined that the engine 6 is in high-load state, then steps 2011 to 2016 are executed so that feedback control is performed by supplying the engine 6 with a mixture richer than the stoichiometric value. In the step 2011, the second voltage Vb (see line B in FIG. 2) is applied to the gas sensor 1 instead of the first voltage Va. In the following step 2012, a value of the output current "$i_R$" of the gas sensor 1 which represents a most suitable air/fuel ratio to the present high-load engine operating condition is read out from the map within the ROM using engine speed N and intake air quantity Q. For instance, in the case of sudden acceleration, a desired value of the output current "$i_R$" suitable for the accelerating condition may be read out from a particular map provided for fuel increase on acceleration. In the case that the engine 6 is in high-load state, a desired value of the output current "$i_R$" suitable for the high-load state may be read out from a particular map provided for fuel increase on high-load operation. Once the value of a desired output current "$i_R$" is determined, the following steps 2013 to 2016 are executed in the same manner as in the steps 2007 to 2010 for controlling air/fuel ratio so that the actual output current "i" equals the desired value "$i_R$", and description of these steps is omitted.

When a desired air/fuel ratio changes from the lean region to the rich region or vice versa beyond the stoichiometric value or a value close thereto, it is necessary to obtain a smooth transition since the output current "i" from the gas sensor 1 drastically varies. To this end hyesterisis characteristic may be given to the switching operation between the curves D and E of FIG. 3. More specifically, in the step 2004 for determining if the engine 6 is in high load state or not, a desired air/fuel ratio may be read out from the ROM using engine parameters Q and N, and then it is determined wether the desired air/fuel ratio is above or below a predetermined air/fuel ratio which is close to the stoichiometric value. To give hysteresis therefore, this predetermined value is shifted to a higher value when switching from the curve D to the other curve E, and is shifted to a lower value when switching in an opposite manner. Furthermore, the detection of the gas sensor 1 output may be temporarily interupted so that the output signal from the gas sensor 1 or the output signal from the input processing circuit 300 becomes stable for achieving smooth transistion between the two curves D and E. Such countermeasures may be combined if desired.

In the above embodiment, although the invention has been described in connection with a fuel injection system of the type of airflow detection, the application of the present invention is not limited to such a system. More specifically, the present invention may be applicable to fuel injection systems of other types, such as intake pressure detection type, throttle valve opening degree detection type and so on. Furthermore, the present invention is also applicable to a fuel supply system using one or more carburetors.

The above-described embodiments are just examples of the present invention, and therefore, it will be apparent for those skilled in the art that many modifications and variations may be made without departing from the spirit of the present invention.

What is claimed is:

1. An air/fuel ratio control apparatus for an internal combustion engine, comprising:

(a) means for detecting operating conditions of said engine;

(b) a gas sensor of constant-current type for detecting and outputting a signal indicative of a gas component includes in exhaust gases from said engine so that air/fuel ratio of an air-fuel mixture fed to said engine is detected at least when said air/fuel ratio is richer than a stoichiometric value or a value close thereto;

(c) voltage source means for applying a predetermined voltage to said gas sensor, said predetermined voltage being set to a value so that said gas sensor does not exhibit a constant-current characteristic;

(d) air/fuel ratio control means for controlling the air-fuel mixture fed to said engine; and (e) computing means, responsive to said detected operating conditions and said signal from said gas sensor, for determining whether said engine is required to receive an air-fuel mixture which is richer than said stoichiometric value or said value close thereto or not, for causing said voltage source means to apply said predetermined voltage to said gas sensor only when said engine requires a rich mixture, and for causing said air/fuel ratio control means to supply to said engine an air-fuel mixture of a desired air/fuel ratio, based on said detected operating conditions and said signal from said gas sensor, when said engine requires a rich mixture.

2. An air/fuel ratio control apparatus for an internal combustion engine, comprising:

(a) means for detecting operating conditions of said engine;

(b) a gas sensor of constant-current type for detecting and outputting a signal indicative of a gas component included in exhaust gases from said engine so that air/fuel ratio of an air-fuel mixture fed to said engine is detected;

(c) a variable voltage source means for controllably applying a voltage to said gas sensor;

(d) air/fuel ratio control means for controlling the air-fuel mixture fed to said engine; and (e) computing means, responsive to said detected operating conditions and said signal from said gas sensor, for determining whether said engine is required to receive an air-fuel mixture which is richer than a stoichiometric value or a value close thereto or not, for controlling said variable voltage source means to apply a first predetermined voltage to said gas sensor when said engine requires a lean mixture and a second predetermined voltage higher than said first predetermined voltage to said gas sensor when said engine requires a rich mixture, said first predetermined voltage being set to a value so that gas sensor exhibits a constant-current characteristic and said second predetermined voltage being set to a value so that gas sensor does not exhibit a constant-current characteristic, and for causing air/fuel ratio control means to supply to said engine an air-fuel mixture of a desired air/fuel ratio, based on said detected operating conditions and said signal from said gas sensor.

3. A method of controlling air/fuel ratio of an air-fuel mixture supplied to an internal combustion engine, comprising the steps of:

(a) detecting operating conditions of said engine;

(b) detecting a gas component included in exhaust gases from said engine by way of a gas sensor of constant-current type so that the air/fuel ratio of an air-fuel mixture fed to said engine is detected;

(c) determining whether said engine is required to receive an air-fuel mixture which is richer than the stoichiometric value or a value close thereto or not;

(d) applying a first predetermined voltage to said gas sensor when said engine requires a lean mixture and a second predetermined voltage higher than said first predetermined voltage to said gas sensor when said engine requires a rich mixture, said first predetermined voltage being set to a value sufficient to cause said gas sensor to exhibit a constant-current characteristic and said second predetermined voltage being set to a value sufficient to cause said gas sensor to not exhibit said constant-current characteristic; and (e) controlling the air/fuel ratio of said mixture to a desired air/fuel ratio based on said operating conditions and an ouput signal from said gas sensor.

4. A method as claimed in claim 3, further comprising the step of giving a hysteresis characteristic to said output signal from said gas sensor when the voltage applied to said gas sensor is changed from said first predetermined voltage to said second predetermined voltage or vice versa.

5. An air/fuel ratio control apparatus as claimed in claim 1, wherein said predetermined voltage is higher than a voltage at which said gas sensor exhibits said constant-current characteristic.

6. An air/fuel ratio control apparatus for an internal combustion engine, comprising:

sensor means disposed in an exhaust passage of said engine for detecting the air/fuel ratio of an air/fuel mixture supplied to said engine, said sensor means producing a first output signal varying in accordance with the air/fuel ratio of a mixture leaner than the stoichiometric value but kept substantially constant relative to a first range of voltage supplied thereto, and said sensor means producing a second output signal varying in accordance with both the air-fuel ratio of a mixture leaner and richer than the stoichiometric value with a second range of voltage higher than said first range of voltage supplied thereto;

voltage supply means for supplying said sensor means with a voltage within said second range of voltage when said engine requires said air/fuel ratio thereof to be richer than said stoichiometric value; and feedback means for feeding back said second output signal from said sensor means to control said air/fuel mixture supplied to said engine toward the required air/fuel ratio richer than said stoichiometric value.

* * * * *